United States Patent
Patil et al.

(10) Patent No.: US 7,313,087 B2
(45) Date of Patent: Dec. 25, 2007

(54) DISTRIBUTED PROTECTION SWITCHING

(75) Inventors: Lingaraj S. Patil, Wexford, PA (US);
Barton J. Milburn, Baden, PA (US);
Harmeet Singh Sahni, Cranberry Township, PA (US); Rajeev Sehgal, Wexford, PA (US); Harry Ostaffe, Cranberry Township, PA (US)

(73) Assignee: Ericsson AB, Stockholm (SE)

( * ) Notice: Subject to any disclaimer, the term of this patent is extended or adjusted under 35 U.S.C. 154(b) by 839 days.

(21) Appl. No.: 10/600,184

(22) Filed: Jun. 20, 2003

(65) Prior Publication Data

US 2005/0002339 A1    Jan. 6, 2005

(51) Int. Cl.
*G01R 31/08* (2006.01)
(52) U.S. Cl. .................... 370/217; 370/242
(58) Field of Classification Search ........ 370/242–245, 370/397, 399, 401, 409, 216–224
See application file for complete search history.

(56) References Cited

U.S. PATENT DOCUMENTS

| | | | |
|---|---|---|---|
| 4,452,248 A * | 6/1984 | Keller, Jr. | 607/9 |
| 5,548,639 A * | 8/1996 | Ogura et al. | 379/221.04 |
| 6,215,765 B1 * | 4/2001 | McAllister et al. | 370/217 |

(Continued)

FOREIGN PATENT DOCUMENTS

EP    0 961 518 A2    12/1999

OTHER PUBLICATIONS

Balakrishnan R. et al., "Scalable Robust Control Plane for Broadband Networks: Network operators can scale their existing PVC-based ATM networks to very large sizes by migrating to SPVC, and can offer non-stop routing and switching services," Alcatel Telecommunications Review, Alcatel, Paris Cedex, FR, pp. 1-7, (Jul. 2002).

*Primary Examiner*—Wing Chan
*Assistant Examiner*—Hong Sol Cho
(74) *Attorney, Agent, or Firm*—Ansel M. Schwartz

(57) ABSTRACT

A system for responding to failures of connections in a network. In one embodiment, there is a system for responding to destination failures involving SPVx (switched-permanent virtual circuit) connections includes a primary source node. The system includes a primary source switch for producing an SPVx connection, the primary source node in communication with the primary source switch. The system includes a primary destination node. The system includes a primary destination switch for receiving the SPVx connection, the primary destination node in communication with the primary destination switch, the connection following a primary path between the primary source node and the primary destination node. The system includes an alternate destination node. The primary destination switch redirects automatically the primary connection to the alternate destination node along an alternate path when the primary destination switch detects a failure of the primary path. The alternate path is formed by the primary source node and the alternate destination node only after the primary path experiences a failure. The primary destination switch releases the SPVx connection after there is a fault detected on the primary path. The primary source switch makes multiple attempts to reestablish the SPVx connection with the primary destination node after a failure is detected on the primary path. The primary source switch redirects automatically the SPVx connection to the alternate destination node. The primary source switch re-establishes the SPVx connection to the primary destination node when the failure condition clears. A method for responding to failures of connections in a network.

27 Claims, 1 Drawing Sheet

U.S. PATENT DOCUMENTS

| | | | |
|---|---|---|---|
| 6,272,107 B1 * | 8/2001 | Rochberger et al. | 370/216 |
| 6,353,594 B1 | 3/2002 | Tooker et al. | |
| 6,643,254 B1 * | 11/2003 | Kajitani et al. | 370/217 |
| 6,661,773 B1 * | 12/2003 | Pelissier et al. | 370/228 |
| 6,810,009 B1 * | 10/2004 | Itoi | 370/218 |
| 6,990,068 B1 * | 1/2006 | Saleh et al. | 370/225 |
| 7,093,027 B1 * | 8/2006 | Shabtay et al. | 709/239 |
| 2001/0010681 A1 * | 8/2001 | McAllister et al. | 370/228 |
| 2003/0179700 A1 * | 9/2003 | Saleh et al. | 370/216 |

* cited by examiner

DISTRIBUTED PROTECTION SWITCHING

FIELD OF THE INVENTION

The present invention is related to responding to failures of connections in a telecommunications network. More specifically, the present invention is related to responding to failures of connections in a telecommunications network where only a single end-to-end connection is established at any given time and there exists multiple re-route options with one of the re-route options being used to maintain just one end-to-end connection when the single end-to-end connection fails.

BACKGROUND OF THE INVENTION

Network operators providing PVC services to the customers using the SPVx features had the following problems.

a. On destination node failures the SPVx on the originating node have to be reconfigured to the alternate destination. [Manual user intervention was required, upon the detection of the destination failure.]

b. To provide network service guarantees to the PVC customer, the network operator had to configure shadow connections from the source node to the alternate destination node.

Destination SPVx resiliency protects the originating SPVx connections upon the destination node failures [fabric level, portcard/port level as well as system level failures]. When multiple attempts to setup a SPVx connection fails with one of the user pre-configured failure codes the SPVx call will be automatically redirected to the alternate destination specified by the user.

Nortel Networks, Inc. supports two features that have similarity with the present invention.

1. SVC call redirection feature allows multiple (up to seven) X.121/E.164 alternate addresses to be specified. If a call attempt to a destination fails, the alternate destinations will be tried automatically.

2. The second feature is called SVC hunt group. A single X.121/E.164 address serves multiple end devices. Calls are automatically distributed between the multiple end devices, depending on the end device resource availability.

Some of the differentiating factors of the present invention are,

When there is a failure on the active SPVx connection the destination detects the failure and releases the SPVx call with switchover information in the release message to trigger a redirection to an alternate destination.

The present invention does not simply redirect all the calls that fail to the alternate destination. Instead, the user can configure the failure codes that should trigger a redirection. If three attempts to setup a call fails with one of the specified failure codes, the call automatically gets redirected to the alternate destination.

After a redirection to the alternate destination has taken place, the source node periodically tries to restore the connection back to the primary destination and free up the resources on the secondary destination. In addition, these techniques are applicable to failures of connections, in general, whether they be on the source side, or anywhere between the source and the destination.

SUMMARY OF THE INVENTION

The present invention pertains to a system for responding to failures of connections in a network. The system comprises a primary source switch having multiple re-route options. The system comprises a primary source node connected to the primary source switch. The system comprises a primary destination switch. The system comprises a primary destination node connected to the primary destination switch. The primary source node establishing a single end-to-end connection across the network between the primary source node and the primary destination through the primary source switch. The primary source switch re-routing the connection across the network along one of the multiple re-route options by maintaining just one end-to-end connection between the primary source node and the primary destination node when the single end-to-end connection fails.

The present invention pertains to a system for responding to destination failures involving SPVx connections. The system comprises a primary source node. The system comprises a primary source switch for producing an SPVx connection. The primary source node in communication with the primary source switch. The system comprises a primary destination node. The system comprises a primary destination switch for receiving the SPVx connection. The primary destination node in communication with the primary destination switch. The connection following a primary path between the primary source node and the primary destination node. The system comprises an alternate destination node. The primary destination switch redirecting automatically the primary connection to the alternate destination node along an alternate path when the primary destination switch detects a failure of the primary path. The alternate path formed by the primary source node and the alternate destination node only after the primary path experiences a failure.

The present invention pertains to a system for responding to failures involving SPVx connections. The system comprises a primary source node. The system comprises a primary source switch for producing an SPVx connection. The primary source node in communication with the primary source switch. The system comprises a primary destination node. The system comprises a primary destination switch for receiving the SPVx connection. The primary destination node in communication with the primary destination switch. The connection following a primary path between the primary source node and the primary destination node. The system comprises an alternate source switch. The system comprises an alternate source node in communication with the alternate source switch. The alternate source switch re-establishing automatically the connection to the primary destination node along an alternate path when the primary source switch detects a failure of the primary path. The alternate path formed by the alternate source node and the primary destination node only after the primary path experiences a failure.

The present invention pertains to a method for responding to failures involving SPVx connections. The method comprises the steps of forming an SPVx connection between a primary source node and a primary destination node. There is the step of detecting a failure on a primary path having the primary source node. There is the step of re-establishing automatically the SPVx connection along an alternate path having the primary destination node.

The present invention pertains to a method for responding to destination failures involving SPVx connections. The method comprises the steps of forming an SPVx connection between a primary source node and a primary destination node. There is the step of detecting a failure in a primary path between the primary source node and the primary destination node. There is the step of redirecting automatically the SPVx connection to an alternate destination node.

The present invention pertains to a method for responding to failures of connections in a network. The method comprises the steps of establishing a single end-to-end connection across a network between a primary source node and a primary destination node with multiple re-route options. There is the step of experiencing a failure in the connection. There is the step of re-routing the connection across the network along one of the multiple re-route options by maintaining just one end-to-end connection between the primary source node and the primary destination node.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
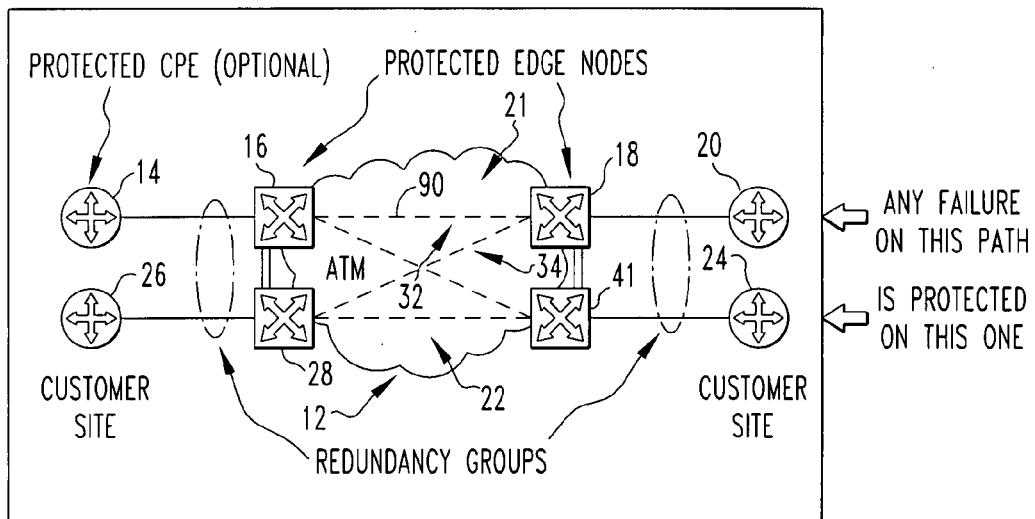
FIG. 1 is a schematic representation of a system of the present invention.

Referring now to the drawings wherein like reference numerals refer to similar or identical parts throughout the several views, and more specifically to FIG. 1 thereof, there is shown a system 10 for responding to failures of connections in a network 12. The system 10 comprises a primary source switch 16 having multiple re-route options. The system 10 comprises a primary source node 14 connected to the primary source switch 16. The system 10 comprises a primary destination switch 18. The system 10 comprises a primary destination node 20 connected to the primary destination switch 18. The primary source node 14 establishing a single end-to-end connection across the network 12 between the primary source node 14 and the primary destination node 20 through the primary source switch 16. The primary source switch 16 re-routing the connection across the network 12 along one of the multiple re-route options by maintaining just one end-to-end connection between the primary source node 14 and the primary destination node 20 when the single end-to-end connection fails.

Preferably, the primary destination switch 18 releases the single end-to-end connection after there is a fault detected on the single end-to-end connection. The primary source switch 16 preferably makes multiple attempts to reestablish the single end-to-end connection with the primary destination node 20 after a failure is detected on the single end-to-end connection. Preferably, the single end-to-end connection is an SPVX connection and wherein the primary source switch redirects automatically the SPVx connection to the alternate destination node 24.

The primary source switch 16 preferably re-establishes the SPVx connection to the primary destination node 20 when the failure condition clears. Preferably, the primary destination switch releases the SPVx connection after there is a fault detected on the primary path 21. The primary source switch 16 preferably makes multiple attempts to reestablish the SPVx connection with the primary destination node 20 after a failure is detected on the primary path 21. Preferably, the primary source switch redirects automatically the SPVx connection to the alternate destination node 24.

The present invention pertains to a system 10 for responding to destination failures involving SPVx connections. The system 10 comprises a primary source node 14. The system 10 comprises a primary source switch 16 for producing an SPVx connection, the primary source node 14 in communication with the primary source switch 16. The system 10 comprises a primary destination node 20. The system 10 comprises a primary destination switch 18 for receiving the SPVx connection. The primary destination node 20 in communication with the primary destination switch 18. The connection following a primary path 21 between the primary source node 14 and the primary destination node 20. The system 10 comprises an alternate destination node 24. The primary destination switch 18 redirecting automatically the primary connection to the alternate destination node 24 along an alternate path 22 when the primary destination switch 18 detects a failure of the primary path 21. The alternate path 22 formed by the primary source node 14 and the alternate destination node 24 only after the primary path 21 experiences a failure.

The primary path 21 extends from the primary source node 14 to the primary source switch 16 through the network 12 along the length 30 of a primary portion 32 to the primary destination switch 18 into the primary destination node 20.

The alternate path 22 is essentially any path other then the primary path 21. The alternate path 22 for example extends from the alternate source node 26 to alternate source switch 28 through the network 12 along a primary portion 34 to the primary destination switch 18 into the primary destination node 20. Alternatively, for example, from the alternate source switch 28, the alternate path 22 can extend through the network 12 along the primary portion 34 to an alternate destination switch 41 to the alternate destination node 24.

Preferably, wherein the primary destination switch 18 releases the SPVx connection after there is a fault detected on the primary path 21. The primary source switch 16 preferably makes multiple attempts to reestablish the SPVx connection with the primary destination node 20 after a failure is detected on the primary path 21. Preferably, the primary source switch 16 redirects automatically the SPVx connection to the alternate destination node 24. The primary source switch 16 preferably re-establishes the the SPVx connection to the primary destination node 20 when the failure condition clears.

The present invention pertains to a system 10 for responding to failures involving SPVx connections. The system 10 comprises a primary source node 14. The system 10 comprises a primary source switch 16 for producing an SPVx connection. The primary source node 14 in communication with the primary source switch 16. The system 10 comprises a primary destination node 20. The system 10 comprises a primary destination switch 18 for receiving the SPVx connection. The primary destination node 20 in communication with the primary destination switch 18. The connection following a primary path 21 between the primary source node 14 and the primary destination node 20. The system 10 comprises an alternate source node 26. The alternate source switch 28 re-establishing automatically the connection to the primary destination node 20 along an alternate path 22 when the primary source switch detects a failure of the primary path 21. The alternate path 22 formed by the alternate source node 26 and the primary destination node 20 only after the primary path 21 experiences a failure.

Preferably, the primary source switch 16 in communication with the alternate source switch 28 to identify to the alternate source switch 28 there is a failure in regard to the primary path 21. The alternate source switch 28 preferably re-establishes the SPVx connection from the alternate source node 26 to the primary destination node 20 when the primary source node 14 fails. Preferably, the alternate source switch 28 re-establishes the SPVx connection from the alternate source node 26 to the primary destination node 20 when a link 30 between the primary source node 14 and the primary source switch 16 fails. The alternate source switch 28 preferably re-establishes the SPVx connection from the alternate source node 26 to the primary destination node 20 when the primary switch fails.

Preferably, the system 10 includes a network 12, and wherein the alternate source switch 28 re-establishes the SPVx connection from the alternate source node 26 to the primary destination node 20 through the alternate source switch 28 and a primary portion 34 of the alternate path 22 through the network 12 when a primary portion 32 of the primary path 21 through the network 12 fails. The alternate source switch 28 preferably re-establishes the SPVx connection from the alternate source switch 28 to the primary source switch 16 to the primary destination node 20 through a primary portion 32 of the primary path 21 through the network 12 and through the primary source switch 16 when the primary source node 14 fails and a primary portion 34 of the alternate path 22 through the network 12 fails. Preferably, the primary source node 14 re-establishes the connection from the primary source node to the primary destination node 20 if the failure has cleared.

The present invention pertains to a method for responding to failures involving SPVx connections. The method comprises the steps of forming an SPVx connection between a primary source node 14 and a primary destination node 20. There is the step of detecting a failure on a primary path 21 having the primary source node 14. There is the step of re-establishing automatically the SPVx connection along an alternate path 22 having the primary destination node 20.

Preferably, there is the step of communicating between a primary source switch 16 in communication with the primary source node 14 and an alternate source switch 28 in communication with an alternate source node 26 to identify to the alternate source switch 28 there is a failure in regard to the primary source node 14. The re-establishing step preferably includes the step of re-establishing the SPVx connection from the alternate source node 26 to the primary destination node 20 when the primary source node 14 fails.

Preferably, the re-establishing step includes the step of re-establishing the SPVx connection from the alternate source node 26 to the primary destination node 20 when a link 30 between the primary source node 14 and the primary source switch 16 fails. The re-establishing step preferably includes the step of re-establishing the SPVx connection from the alternate source node 26 to the primary destination node 20 when the primary source switch 16 fails.

Preferably, the re-establishing step includes the step of re-establishing the SPVx connection from the primary source switch 16 through the alternate source switch 28 to the primary destination node 20 through a primary portion 34 of the alternate path 22 of a network 12 when a primary portion 32 of the primary path 21 through the network 12 fails. The re-establishing step preferably includes the step of re-establishing the SPVx connection from the alternate source switch 28 to the primary source switch 16 to the primary destination node 20 through a primary portion 32 of the primary path 21 when the primary source node 14 fails and a primary portion 34 of the alternate path 22 through the network 12 fails. Preferably, there is the step of re-establishing the SPVx connection from the primary source switch 16 to the primary destination node 20 after the failure has cleared.

The present invention pertains to a method for responding to destination failures involving SPVx connections. The method comprises the steps of forming an SPVx connection between a primary source node 14 and a primary destination node 20. There is the step of detecting a failure in a primary path 21 between the primary source node 14 and the primary destination node 20. There is the step of redirecting automatically the SPVx connection to an alternate destination node 24.

Preferably, there is the step of making multiple attempts to reestablish the SPVx connection with the primary destination node 20. The detecting step preferably includes the step of detecting a failure of the primary destination node 20. Preferably, there is the step of releasing the SPVx connection by the primary destination node 20. The redirecting step preferably includes the step of redirecting automatically by the primary source node 14 the SPVx connection to the alternate destination node 24. Preferably, after the redirecting step there is the step of trying to restore the SPVx connection with the primary destination node 20. There is preferably the step of configuring failure codes that trigger a redirection of the SPVx connections.

The present invention pertains to a method for responding to failures of connections in a network 12. The method comprises the steps of establishing a single end-to-end connection across a network 12 between a primary source node 14 and a primary destination node 20 with multiple re-route options. There is the step of experiencing a failure in the connection. There is the step of re-routing the connection across the network 12 along one of the multiple re-route options by maintaining just one end-to-end connection between the primary source node 14 and the primary destination node 20.

Preferably, the experiencing step includes the step of detecting a failure in the primary destination node 20; and the re-routing step includes the step of redirecting automatically the connection to an alternate destination node 24. The detecting step preferably includes the step of detecting a failure of the primary destination node 20. Preferably, there is the step of releasing the SPVx connection by the primary destination node 20.

The redirecting step preferably includes the step of redirecting automatically by the primary source node 14 the SPVx connection to the alternate destination node 24. Preferably, after the redirecting step there is the step of trying to restore the SPVx connection with the primary destination node 20. There is preferably the step of configuring failure codes that trigger a redirection of the SPVx connections. Preferably, there are the steps of making multiple attempts to reestablish the connection with the primary destination node 20.

The experiencing step preferably includes the step of detecting a failure on a primary path 21 having the primary source node 14 and the re-routing step includes the step of redirecting automatically the connection along an alternate path 22 having the primary destination node 20. Preferably there is the step of communicating between a primary source switch 16 in communication with the primary source node 14 and a alternate source switch 28 in communication with an alternate source node 26 to identify to the alternate source switch 28 there is a failure in regard to the primary source node 14. The re-establishing step preferably includes the step of re-establishing the SPVx connection from the alternate source node 26 to the primary destination node 20 when the primary source node 14 fails.

Preferably, the re-establishing step includes the step of re-establishing the connection from the alternate source node 26 to the primary destination node 20 when a link 30 between the primary source node 14 and the primary source switch 16 fails. The re-establishing step preferably includes the step of re-establishing the connection from the alternate source node 26 to the primary destination node 20 when the primary source switch 16 fails. Preferably, the re-establishing step includes the step of re-establishing the connection from the primary source switch 16 through the alternate source switch 28 through the primary destination node 20 through a secondary portion of the alternate path 22 of a network 12 when a primary portion 32 of the primary path 21 through the network 12 fails. The re-establishing step preferably includes the step of re-establishing the connection from the alternate source switch 28 to the primary source switch 16 to the primary destination node 20 through a primary portion 32 of the primary path 21 when the primary source node 14 fails and a secondary portion of the alternate path 22 through the network 12 fails. Preferably, there is the step of re-establishing the end-to-end connection through the primary source switch 16 when the failure clears.

The following distinction is made regarding permanent virtual channel connections, and soft permanent channel connections. Permanent virtual channel connections are connections created through an ATM network. The ATM switches and the corresponding virtual channels through the switches are fixed. The intermediate switches and corresponding VPI and VCI values are fixed during the creation of the permanent virtual channel connection, and the paths and the VPI and VCI are previously determined before they are actually formed.

On the contrary, a soft permanent connection is created by just specifying the source switch, source port, source VPI/VCI, NSAP address of destination switch. It is the responsibility of the source switch to automatically setup the soft permanent channel connection dynamically using signaling procedures and an optimal routing path from the source switch to the destination switch. This is far superior to permanent virtual channel connection in the sense that management is much simpler, if there is a failure in the intermediate node, there are mechanisms to reroute the connection within the network. Thus, much more can be done with soft permanent connections than with permanent virtual connections.

In addition the following distinction is made regarding permanent virtual paths, and soft permanent paths. Permanent virtual path connections are connections created through an ATM network. The ATM switches and the corresponding virtual paths through the switches are fixed. The intermediate switches and corresponding VPI value is fixed during the creation of the permanent virtual path connection, and the paths and the VPI are previously determined before they are actually formed.

On the contrary, a soft permanent path connection is created by just specifying the source switch, source port, source VPI, NSAP address of the destination switch. It is the responsibility of the source switch to automatically setup the soft permanent path connection dynamically using signaling procedures and an optimal routing path from the source switch to the destination switch. This is far superior to permanent virtual path connection in the sense that management is much simpler, if there is a failure in the intermediate node, there are mechanisms to reroute the connection within the network. Thus, much more can be done with soft permanent path connections than with permanent virtual path connections.

A Switched-Permanent Virtual Circuit (SPVC) is a PVC that is established manually across a UNI and dynamically across a Network-to-Network Interface (NNI). The SPVC stays up through the ATM network inspite of many failures. If there is an ATM switch failure, the SPVC will be rerouted over the ATM network.

Figure 2:
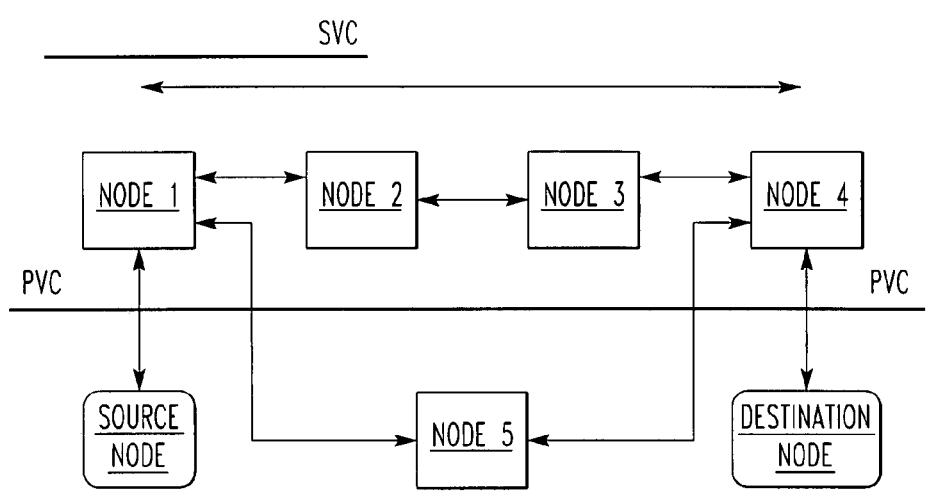
FIG. 2 is a schematic representation showing where PVCs and SVCs are configured.

FIG. 2 shows where the PVCs and SVCs are configured.

Node1 to Node5 are intermediate nodes which encompass the network, the SVC passes through them. Node5 forms an alternate path to Destination node, incase node3 fails.

A Permanent Virtual Circuit (PVC) is connection manually provisioned by a network operator over an ATM-switched network between a specific source and a specific destination. A PVC is provisioned to last from a day to several years, or until the service is terminated.

A Switched Virtual Circuit (SVC) is a connection that is dynamically established by end devices through the UNI/NNI signaling method. There must be an ATM switch between the end-devices that will dynamically route the call through the ATM cloud. Network operators do not have to manually configure every ATM switch in the path. If there is a link failure, the end-device reinitiates the SVC call.

Software: The software which implements the present inventions runs on switches. If the connections protected are ATM connections then the software will be residing on the ATM switch, if it is MPLS connection then the software will be residing in the MPLS Switch. Specifically within the switches the software itself might be residing on the memory on Switch controller processors (SCP) or MCPs which reside on the portcards or network modules. The switch software might be executed by the SCPs or the MCPs.

In the operation of the invention, a network 12 operator who provides PVC services to a customer will have the following advantages.

Destination node failures result in minimal traffic disruption to the PVC end user, while the connection is automatically reconfigured to the alternate destination without any user intervention.

Combined with the source SPVx resiliency feature, the network 12 provider is able to provision robust, self-healing network 12 connections with no single point of failure and provide service guarantees to the PVC user.

A cost effective resiliency solution.

Operator has the flexibility to configure the failure codes that would trigger the call redirection.

After a call redirection, the source node will periodically try to restore the call on primary destination. When the fault on primary destination has been resolved, the call will be automatically restored to the primary destination, freeing up secondary destination resources.

The SPVCs configured on the source switch 16 will have two destinations each (destination switch 18 and destination switch 41). So that if one destination becomes unreachable the SPVC will be setup to the second destination. This will provide all of the redundancy required on the right side of the Network 12. Source resiliency is required to provide resiliency on the source side.

Source SPVx resiliency feature enables protection against the following failures:

Source SPVC resiliency feature protects against the following failures:
1. One of the data source going down
2. The link between the data source and the ATM switch going down
3. One of the ATM switch on the local site going down
4. The link between the ATM switch at the local site and the ATM network 12 going down (the link between the other ATM switch at the local site and the ATM network 12 is still UP)

5. Some transient errors in the ATM network 12 connecting the Local Sites and the Destination switchs
6. One of the data source and the link between the other ATM switch at the local site and the ATM network 12 going down. In FIG. 1, this corresponds to either the Working Cell Source going down or the link between the working Cell Source and the source switch1 going down and the link 30 between the source switch2 and the ATM network 12 going down.

There should be just one active SPVX going from the Local Site to the Destination switch through the ATM network 12. The exception is when there is some transient error in the ATM network 12 or if the two source switches on the local site cant communicate with each other because of hardware or protocol failure. In this case, there might be two connections going from the local site to the destination switch. However, this situation should heal quickly and one of the connections should be torn-down.

The solution will involve creating the same SPVC (same SPVCid) on both the switches on the local site. Users must be allowed to associate these two SPVXs by specifying the signaling interface used to connect to the other switch and if the SPVX has the primary or backup role.

The switches on the local site should periodically poll each other for the health of the configured SPVCs. This polling interval must be configurable. If during polling, a SPVX is found to be in DOWN state, the polling switch will setup that call. Users will be allowed to configure the polling interval and number of connections to be polled per polling cycle.

If a SPVC is in an UP state on a switch and during polling, it finds that its peer has the SPVC in UP state also, then SPVC will be maintained only on the primary source. The backup source will tear down the connection.

To protect against the data source going down, users will be allowed to configure a "dead-silence" time interval. If the data source doesn't transmit for this duration of time, then the data source will be declared as dead. This monitoring will be done on per connection basis and marked DOWN if the data source goes down. In the next polling cycle the polling switch will monitor the state of these SPVCs and then setup those calls.

By providing dynamic redundancy protection, SPVx Source resiliency enables public and private network 12 operators to
improve service availability
to lower the cost of redundancy protection
reduce bandwidth consumption for redundancy Operators can use this feature in Broadcast video, wireless cell sites, DSL/B-RAS, multiservice edge.

Enterprise networks can use this for Disaster recovery and Broadcast video.

This eliminates redundancy bandwidth usage across the networks and thus saves money.

This eliminates dedicated diverse routes across the network 12.

In the operation of the invention:

The solution enables the customers to have redundant data sources.

The requirement is to a backup SPVC so that if one source switch goes down, SPVC is setup from the other source. At any given point of time, there should be only one SPVC from switch 16 or switch 28, but not both. So there needs to be communication between source switch 16 and source switch 28 to check the status of their partner SPVC and accordingly bring up/down the local SPVC.

This communication between two partner switches will be achieved through requiring a signaling (UNI3.x, UNI4.x, or PNNI) interface between the two source switches. If the two source switches are co-located, then they can be interconnected by a local cable/fiber. If the two source switches are not co-located, then they can be connected via a "through-path" through the Network 12. Then a signaling interface can be created on each source switch so the source switches appear to each other to be adjacent. Using ILMI they will poll each other for the status of SPVC and accordingly bring up/down their local SPVC so that only one SPVC is up at any given time. They could also use some other protocol to poll each other and find out the status of their respective SPVCs.

There are two steps for creating a Source resilient SPVx, they are:

1) Create source resiliency information entry in a table and give it a index, Sig If and Sig VPI for the signaling interface which is used for querying the status of the partner SPVX. The role that the SPVX will assume if it uses this source resiliency index, enable/disable status of Dead silence timer which indicates whether to delete SPVx if the traffic flow stops, and the name.

| Source resiliency information index | Sig If | Sig VPI | Role | Dead silence timer | Name |
|---|---|---|---|---|---|
| 1 | 1a1 | 0 | Primary | Enabled | Conn1 |

2) Create a SPVX and make it source resilient SPVX by associating it with this source resiliency information index.

Similarly, a corresponding entry should be created on the partner switch with partner source resiliency information and associate it with the secondary SPVX, viz.

| Source resiliency information index | Sig If | Sig VPI | Role | Dead silence timer | Name |
|---|---|---|---|---|---|
| 1 | 1b1 | 0 | Secondary | Enabled | Conn1 |

"index" and "role" indicate the spvcid and the role of the SPVC with which this "info" will be associated. "sigif" and "vpi" indicate the signaling interface on which ILMI/SNMP queries should be done to get the status of the partner SPVC. For different permutations and combinations of these options, user should create different individual entries and associate the SPVCs with those entries. There could be many SPVCs pointing to one such entry. "dead_silence_timer" indicates whether the cell counting is enabled for the SPVCs associated with this entry or not. This is by default disabled. This can be used to enable the cell counting for the associated SPVCs and the SPVCs will be brought down if the cell count does not increment for 'n' seconds, which indicates that the source is dead. This time period, 'n' is user configurable.

This information can be displayed to the user as follows:

```
primary switch:connections spvc-pp-resiliency-> show ?
    [[-index] <integer>           Source       Resilient Info
                                  Index
    [[-sigIf] <AtmIf>             Source Resilient SigIf
    [[-vpi]   <integer>           Signalling If VPI
    [[-ilmi_state <up|down>       ILMI Oper status of the
                                  SigIf
    [[-role] (primary|secondary)  Source       Resilient SPVC
                                  role
    [[-dead_silence_timer]]       Status of Dead Silence
                                  Timer counting.
    [[-name] <text( size 0 . . . 31)>]  Name (default: " ")>]
```

```
            primary switch:connections spvc-pp-src-resiliency-> show
                                            Dead
Index  SigIf  Vpi  ILMI state  Role  Silence-Timer  Name
  1    1a1     0      up       Primary   Enabled    Conn1
```

Main SPVC Menu:

To create a source resilient SPVC, the user can create a SPVC and provide the index of source resiliency information entry created earlier.

An example of an SPVC creation command could be as follows.

```
switch:connections spvcc pp-> new ?
    [[-index] <integer>]                        Index (default:
                                                1)
        [-callingatmif] <AtmIf>         Src AtmIf
            [-callingvpi] <integer>     Src VPI
            [-callingvci] <integer>     Src VCI
            [-calledatmaddr] <NSAP Address>  Destination NSAP
    [[-calledvpi] <integer>]            Called VPI
    [[-calledvci] <integer>]            Called VCI
    [[-fwdupckey] <UPC Index>]          Fwd UPC
                                        (default: 0)
    [[-bckupckey] <UPC Index>]          Bck UPC
                                        (default: 0)
    [[-bearerclass] <bearerclass>]      Bearer Class
                                        (default:
                                        classX)
    [[-susceptclip] (no|yes)]           CLIP (default:
                                        no)
    [[-fwdqosclass] <QoS Class>]        Fwd QoS (default:
                                        class0)
    [[-bckqosclass] <QoS Class>]        Bck QoS (default:
                                        class0)
    [[-tnssel] <text (size 1 . . . 4)>] Transit Net
                                        Selector
    [[-name] <text (size 0 . . . 31)>]  Name (default: " ")
    [[-reroutestatus] (enabled|disabled)]       Reroute Status
(default:
                                        disabled)
    [[-callingdomain] <integer>]        Calling Domain
                                        (default: 1)
    [[-qosindex] <integer>]             QoS Index (default:
                                        0)
    [[-backoffstatus] (enabled|disabled)]       Backoff Status
                                        (default:
                                        enabled)
    [[-priority] <integer>]             Priority
    [[-dtltag] <DTL Tag>]               DTL Tag
                                        (default: 0)
    [[-autodtl] (enabled|disabled)]     Auto DTL
                                        (default:
                                        enabled)
    [[-rgroupid] <integer>]             Redundancy Group ID
    [[-secondaryvpi] <integer>]         Secondary VPI
    [[-secondaryvci] <integer>]         Secondary VCI
    [[-spvc_call_redirection_index] <integer>] SPVCC
        Redirection
                                                        Info Index
    [[-spvc_src_resiliency_index]       <integer>]      Source
Resiliency Info
                                                        Index
```

The "spvc_src_resiliency_index" is the index of the Source resilient SPVC info that the user wants to associate this SPVC with. SPVC is created in "inhibited" state and this will be automatically moved to "active" state if the partner SPVC state is found to be DOWN. In the "active" state, the SPVC will be eligible for SETUP attempts, if it is in "inhibited" state then the connection will not be eligible for SETUP attempts. This is usually the case when the partner SPVC is UP and you don't want to setup this alternative SPVC until the partner goes down.

The following command shows how to create a source resilient SPVC.

The next command shows how to create a SPVC with both source and destination resiliency.

switch:connections spvcc pp→new-index 1-callingatmif 2a1-callingvpi 0-callingvci 100-calledatmaddr 0x47.0005.80.ffe100.00ae.1e00.0103.0020480d0082.00-calledvpi 0-calledvci 100-spvc_src_resiliency_index 1-spvc_call_redirection_index 1

A normal show will tell which set of parameters(primary/secondary) are active.

```
                switch:connections spvcc pp-> show
        Src:
        ATMIF
        Dst:    VPI  VCI  UPC  VPVC-
INDEX   ATMIF   VPI  VCI  UPC   SEL   PRIORITY  STATE
   1    2A1      0   100   0   require    5       up
        130      0   100   0
```

Destination: 0x47.0005.80.ffe100.00ae.1e00.0103.0020480d0082.00
Redirection
Destination: 0x47.0005.80.ffe100.00ae.1e00.0103.0020480d0072.00
Redirection State: primary
Src Resiliency Index: 1
Src Resiliency State: active Modify Command connections spvc-pp-src-resiliency modify This command performs a modification on the source resiliency table.

```
switch:connections spvc-pp-src-resiliency-> modify ?
    [[-sigIf] <BNP>]              Source Resilient SigIf
    [[-vpi]  <integer>]           Signalling If VPI
    [[-role] <text>]              Source    Resilient SPVC
                                  role
```

-continued

| | |
|---|---|
| [[-dead_silence_timer]] | Status of Dead Silence Timer counting. (default: disabled) |
| [[-name] <text>] | Name (default: " ") |

Dead Silence Timer and Polling Parameters

As mentioned earlier, the partner switches will keep monitoring the state of the partner source resilient SPVXs so that they can take over and setup the local SPVX if the partner SPVX goes down. The interval at which this polling is to be done is user configurable and also the number of SPVXs to be polled per polling interval.

Destination SPVX resiliency feature will allow a PP (Point-to-Point) SPVPC/SPVCC to have two destinations associated with a call—such SPVxCs will be referred to a resilient SPVxCs. The SPVx module will try to setup the SPVx to the primary destination. If the primary destination is not accessible or is down, the SPVx module will attempt to setup the call to the secondary destination.

The user would need to specify both a primary destination NSAP address and a secondary destination NSAP address for a resilient SPVx connection. A non-resilient SPVx connection will not require a secondary destination NSAP address.

The originating source switch would first attempt to build the connection to the primary destination NSAP address. If the primary destination node is reachable and the primary destination switch 18 can meet the SPVx call's, requirements the call setup will be successful.

If the primary destination NSAP address is not reachable due to either a destination switch/fabric failure or isolation from the rest of the network 12 (a "cause Number 3: no route to destination" PNNI call clearing cause is received by the originating switch/fabric), the originating switch would fallback to the secondary destination NSAP address after a predefined number of failed call setup attempts.

In the event of a failure on the primary destination port such as Loss of signal (LOS), Loss of frame (LOF), alarm indication signal (AIS), bit error rate (BER), Signal Failed (SF) condition, or BER Signal Degrade (SD) condition, the destination switch will send a call release message with a "temporary failure" clearing cause with a diagnostic indicating "call redirection request to the protection port".

The originating switch would then attempt to reestablish the call to the secondary destination NSAP address. This assumes the secondary port has no failures and the necessary resources are available.

If both the primary and secondary destination NSAP addresses are unreachable, and the system 10 would keep cycling back and forth between the primary and secondary destinations in a roundrobin fashion: the originating switch would try to contact the primary destination NSAP address first, and then would fallback to the standby destination NSAP address after a predefined number of failed call setup attempts, then would try to contact the secondary destination NSAP address for a predefined number of failed attempts, then would fall back to the primary destination NSAP address and so on.

Similarly, if both the primary and secondary destination atmifs are reachable but are down (carrier is down on both primary and backup destination ports), the originating switch/fabric would keep cycling between both destination ports in a roundrobin fashion: the originating switch/fabric would contact the primary atmif first and would fallback to the backup atmif after the receipt of a call release message with a call redirection request from the primary destination switch 18/fabric, it would then try to contact the secondary atmif and fallback to the primary atmif after the receipt of a call release message with a call redirection request from the backup destination switch/fabric.

Note that the receipt of any other nonconfigured call clearing cause code will NOT trigger a call redirection to the backup port. As an example, if the originating switch/fabric fails to establish the connection to the primary destination NSAP address due to a CAC issue ("cause Number 47: resource unavailable, unspecified" call clearing cause code is received by the originating switch/fabric), an incorrect destination VPI/VCI field specified ("cause Number 34: requested called party spvpc spvcc not available" call clearing cause code), or an incorrect ESI field defined in the destination NSAP address ("Cause Number 28: invalid number format" call clearing cause code), the originating switch will keep attempting to contact the primary destination address at the predefined call pacing rate and will NOT redirect the call to the secondary destination NSAP address.

SPVx connections would be maintained on the backup destination port even after the primary port/fabric has recovered from its original failure condition. The SPVx would be redirected to the primary port under the following scenarios:

Manual intervention—A manual SPVx switchover command would be provided on the originating switch/fabric. This command would instruct the originating switch/fabric to manually clear a given resilient PNNI SPVX and redirect it to the primary destination port. The above command could be also used to manually redirect a resilient PNNI SPVX from its primary destination port to its secondary destination port.

A failure on the backup destination port/fabric would cause redirection of the SPVx connections back to the primary port.

Automated SPVx restoration process—A "restorationinterval" timer can be provided that would define the time interval, in milliseconds, between successive callbacks to the SPVx controller to check for and reroute existing SPVx connections terminated on the secondary destination ports back to their respective primary destination ports. Following the expiration of the "restorationinterval" timer, the originating switch can clear all resilient SPVx connections terminating on the backup destination ports and would attempt to redirect them back to their respective primary ports. In the event the primary NSAP address is still unreachable due to either a destination switch/fabric failure or isolation from the rest of the network 12 (a "cause Number 3: no route to destination" call clearing cause is received by the originating switch/fabric), the system 10 would fallback to the secondary NSAP address after a predefined number of failed attempts. In the event the primary destination port is reachable but is still experiencing a signal failure/degradation condition, the primary destination source switch fabric would clear the incoming call setup with a call clearing cause code of "cause Number 41: temporary failure" with a diagnostic indicating "call redirection request to the protection port" requesting a failover back to the secondary destination NSAP address.

Since the secondary destination NSAP address will most likely be used as a backup the user can setup the backup connection with lesser resource requirements.

The user can optionally specify two different sets of forward and backward UPC contracts for the primary and secondary destinations: one set of forward and backward UPC contracts would be associated with the primary destination NSAP address and a second set of forward and backward UPC contracts would be associated with the secondary destination NSAP address.

In case the backup UPC contracts are not specified, the system 10 will default to the primary UPC contracts when redirecting the call to the secondary NSAP address. Both the primary and secondary UPC contracts must share the same Class of Service (CBR, rtVBR, nrtVBR, ABR, UBR) and policy scheme (CBR.0, CBR.1, VBR.1, VBR.2, VBR.3, ABR.1, UBR.1, UBR.2).

The user can optionally specify two different sets of destination VPI/VCI values: one set of destination VPI/VCI indices will be associated with the primary destination NSAP address and a second set would be associated with the secondary destination NSAP address. In case the backup destination VPI/VCI is not specified, the system 10 will default to the primary destination VPI/VCI contract when redirecting the call to the secondary NSAP address. If no VPI/VCI values are specified for primary destination NSAP address then the destination switches will pick up available VPI/VCI values.

The user can optionally specify two different statically defined DTL indices: one DTL index associated with the primary destination NSAP address and a second DTL index would be associated with the secondary destination NSAP address. In case the backup destination DTL is not specified, the system 10 will default to autoDTL when redirecting the call to the secondary NSAP address.

The user can optionally enable call rerouting for the connection built to the secondary destination NSAP address. By default, call rerouting would be disabled for an SPVx redirected to the secondary destination port.

The user can optionally disable the backoff mechanism for the connection built to the secondary destination NSAP address. By default, the backoff option would be enabled for an SPVx redirected to the secondary destination port.

A new option "call/redirection" can be added to the creation of ATM interface which indicates that the interface will act as a protection interface to another working interface on the network 12.

Destination resiliency allows the following:
  For the Secondary NSAP allows separate values for VPI/VCI, DTL, UPC, backoff, autodtl, reroute.
  Will use secondary NSAP if primary destination is not available.
  Allow user to manually switchover between primary and secondary destinations.
  Automatically try to setup SPVx calls terminating on secondary destinations on their primary destinations after a timeout period that is user configurable. The SPVx to the backup port will be torn down before trying to set it up to the primary port.
  1. Clear destination SPVxs on a "call-redirection" capable AtmIf when physical layer alarms are generated by the alarms package.
  2. Admining down the link associated with the "call-redirection" capable atmif will clear SPVxs terminating on the atmif with the redirection request.
  3. Admining down a netmod with "call-redirection" capable atmif(s) will clear SPVxs terminating on the atmif(s) with the redirection request.

Destination switches with call redirection capability generate an additional cause information element upon call rejection. Since this additional cause IE has the "Call Rejected" cause, the ATM Forum signaling specifications allow this cause value to contain a user specified diagnostic (read proprietary) field. The intent of a "user specified" value is that an end user may provide an application specific reason for a call rejection. If the failure or rejection message already contains a "Call Rejected" cause, a new one is not added.

This extra cause information is carried transparently by both Marconi switches and other vendors switches to the calling device.

The diagnostic field may be up to 28 bytes long (the cause IE may be up to 34 bytes long), however the overhead prior to the diagnostic field uses 7 bytes. This cause value may be used in conjunction with the existing cause value that is already generated indicating the reason for call failure.

The diagnostic field contained within the cause IE contains the following information:

```
            Bits
        8 7 6 5 4 3 2 1    Octets
       +------------------+
       | Rej Reason| Cond |
       |                  |
       | 1 |0 0 0 0 0| 0 0|   1
       +------------------+
       |     FORE OUI     |   2 Note 1
       |                  |
       |0 0 0 0 0 0 0 0|
       +------------------+
       |  FORE OUI (cont) |   3
       |0 0 1 0 0 0 0 0|
       +------------------+
       |  FORE OUI (cont) |   4
       |0 1 0 0 1 0 0 0|

+------------------+
       |  Call     | Loc  |   5   Call Redirection
       | Redirect ID|     |           Identifier
       |1 0 0 0 1 1| x  x |
       +------------------+
       |     Link ID      |   5.1 Note 2
       +------------------+
       |   Link ID (cont) |   5.2
       +------------------+
       |       VPI        |   5.3 Note 3
       +------------------+
       |    VPI (cont)    |   5.4
       +------------------+
       | Prefix ID | Type |   6 Note 4   Switch NSAP
       |                  |                Prefix
       |1 0 0 0 1 0| x  x |               Identifier
       +------------------+
       |   NSAP Prefix    |   6.1-6.13 Note 5
       +------------------+
```

```
Call Failure Location (octet 4)
Bits   |
2 1    | Meaning
-------+-----------------------
0 1    | Call failure at this device NSAP Prefix Type (octet 5)
Bits   |
2 1    | Meaning
-------+-----------------------
0 0    | Default prefix
```

-continued

Note 1. This also serves as a unique identifer within the "user diagnostic" space for a CALL REJECTED cause.
Note 2. The link identifier associated with the call that was cleared.
Note 3. The VPI identifier associated with the call that was cleared.
Note 4. The NSAP Prefix Ident indicates that the 13 byte default prefix follows. The prefix is always 13 bytes, so this is encoded as 10001000 (0x88).
Note 5. The NSAP prefix of the switch that generated is this information element.

When the source switch receives a call reject message it will use the IE described above to determine whether a SPVx call needs to be redirected.

The user interface associated with configuring SPVx Call Redirection is now described.

The commands needed to configure and maintain SPVx Redirection are explained. Each command will be explained with an example usage, as well as by performing a "show" command to view the results of the command.

Steps to create a destination resilient SPVx

1) Enable Redirection on SPVX's primary destination atm. Optionally enable it on the SPVX's secondary destination atmif.

2) On the Source switch create the Redirection information for the Secondary Destination as shown below.

| Redirection Index | VPI/VCI | NSAP Address | Fwd. UPC | Bck. UPC | DTL |
|---|---|---|---|---|---|
| 1 | 0/200 | Address | 1 | 1 | 2 |

3) On the source switch create an SPVX and make it destination resilient by providing the Redirection Index for the secondary destination.

The procedure of a creating a resilient SPVPC is similar.

Details for the following commands using the operator
Connections spvx-pp-redirection new
Connections spvx-pp-redirection show

```
switch:connections spvx-pp-redirection-> new ?
    [[-r_index] <integer>]                      Resilient Info Index (default: 1)
     [-r_calledatmaddr] <NSAP Address>          Destination NSAP
    [[-r_calledvpi] <integer>]                  Called VPI
    [[-r_calledvci] <integer>]                  Called VCI
    [[-r_fwdupckey] <UPC Index>]                Fwd UPC
    [[-r_bckupckey] <UPC Index>]                Bck UPC
    [[-r_fwdqosclass] <QoS Class>]              Fwd QoS
    [[-r_bckqosclass] <QoS Class>]              Bck QoS
    [[-r_name] <text>]                          Name (default: " ")
    [[-r_qosindex] <integer>]                   QoS Index
    [[-r_reroutestatus] (enabled|disabled)]     Reroute Status
                                                  (default: disabled)
    [[-r_backoffstatus] (enabled|disabled)]     Backoff Status
                                                  (default: enabled)
    [[-r_dtltag] <DTL Tag>]                     DTL Tag
    [[-r_autodtl] (enabled|disabled)]           Auto DTL (default:
                                                  enabled)
```

```
switch:connections spvx-pp-redirection-> show ?
    [-advanced]
    [[-r_index] <integer>]                      Resilient Info Index
    [[-r_calledatmaddr] <NSAP Address>]         Destination NSAP
    [[-r_calledvpvcsel] (noPref|require)]       Dst VPVC Sel
    [[-r_calledvpi] <integer>]                  Called VPI
    [[-r_calledvci] <integer>]                  Called VCI
    [[-r_fwdupckey] <UPC Index>]                Fwd UPC
    [[-r_bckupckey] <UPC Index>]                Bck UPC
    [[-r_fwdqosclass] <QoS Class>]              Fwd QoS
    [[-r_bckqosclass] <QoS Class>]              Bck QoS
    [[-r_name] <text>]                          Name
    [[-r_qosindex] <integer>]                   QoS Index
    [[-r_reroutestatus] (enabled|disabled)]     Reroute Status
    [[-r_backoffstatus] (enabled|disabled)]     Backoff Status
    [[-r_dtltag] <DTL Tag>]                     DTL Tag
    [[-r_autodtl] (enabled|disabled) ]          Auto DTL
Delete command
connections spvx-pp-redirection delete
```

The redirection info can only be deleted if it is not part of a resilient SPVxC. So to destroy redirection information the corresponding SPVxCs ("connection spvcc pp" or "connections spvpc" menus) need to be deleted first before deleting the redirection information. The result of the operator is displayed for the delete command below.

```
switch:connections spvx-pp-redirection-> delete ?
    [-r_index] <integer>                        Resilient Info Index
    [[-r_calledatmaddr] <NSAP Address>]         Destination NSAP
    [[-r_calledvpvcsel] (noPref|require)]       Dst VPVC Sel
    [[-r_calledvpi] <integer>]                  Called VPI
    [[-r_calledvci] <integer>]                  Called VCI
    [[-r_fwdupckey] <UPC Index>]                Fwd UPC
    [[-r_bckupckey] <UPC Index>]                Bck UPC
    [[-r_fwdqosclass] <QoS Class>]              Fwd QoS
    [[-r_bckqosclass] <QoS Class>]              Bck QoS
    [[-r_name] <text>]                          Name
    [[-r_qosindex] <integer>]                   QoS Index
    [[-r_reroutestatus] (enabled|disabled)]     Reroute Status
    [[-r_backoffstatus] (enabled|disabled)]     Backoff Status
    [[-r_dtltag] <DTL Tag>]                     DTL Tag
    [[-r_autodtl] (enabled|disabled)]           Auto DTL
Modify command
connections spvx-pp-redirection modify
```

This command performs a modification on the redirection table. This means that the writable fields (displayed under the modify command) can all be modified.

```
switch:connections spvx-pp-redirection-> modify ?
    [-r_index] <integer>                        Resilient Info Index
    [[-r_reroutestatus] (enabled|disabled)]     Reroute Status
    [[-r_backoffstatus] (enabled|disabled)]     Backoff Status
    [[-r_dtltag] <DTL Tag>]                     DTL Tag
    [[-r_autodtl] (enabled|disabled)]           Auto DTL
```

The Switchover Command connections spvcc pp switchover connections spvpc pp switchover The purpose of these commands is to allow the user to manually switchover the SPVxC from the primary destination to the secondary destination; and vice versa.

The switchover command simply accepts the index of the resilient SPVxC, and the destination(primary|secondary) to which the switchover must take place.

```
switch:connections spvcc pp-> switchover ?
    [-index] <integer>                          SPVCC Index
    [-switchoverTo] (primary | secondary)       Switchover To
```

The effects of this command are now shown with an example for an SPVCC:

switch:connections spvcc pp-→switchover-index 1-switchoverTo secondary

| | Src:<br>ATMIF<br>Dst: | VPI | VCI | UPC | VPVC- | | |
|---|---|---|---|---|---|---|---|
| INDEX | ATMIF | VPI | VCI | UPC | SEL | PRIORITY | STATE |
| 1 | 2A1<br>130 | 0<br>0 | 100<br>200 | 0<br>0 | require | 5 | up |

*switch:connections spvcc pp-> show*

Destination:
    0x47.0005.80.ffe100.00ae.1e00.0103.0020480d0082.00

Redirection

Destination:
    0x47.0005.80.ffe100.00ae.1e00.0103.0020480d0072.00

Redirection State: secondary

Autorestoration Timer connections spvcc pp redirection parameters connections spvcc pp redirection parameters The concept of autorestoration refers to having a timer, which when it fires, triggers the switch software to revert all the resilient SPVxCs terminating on the secondary NSAP, back to primary NSAP.

This autorestoration mechanism is configurable by the user. The user can enable/disable this mechanism, and also set the autorestoration timer manually.

This functionality is provided in the "connections spvcc pp redirection parameters" menu for SPVCCs:

```
switch: connections spvcc pp redirection-> parameters
Restoration Timer State:                    disabled
Restoration Timer Interval (Hours):         12
```

This functionality is provided in the "connections spvcc pp redirection parameters" menu for SPVCCs:

```
switch:connections spvpc redirection-> parameters
Auto Restoration Timer Interval (Hours):    enabled
Auto Restoration Timer State:               12
```

In the event of a failure on the active destination NSAP port the destination switch will send a message to the source switch to redirect the SPVxC to the alternate destination NSAP. The redirection request will be implemented through the introduction of a new diagnostic message "call redirection request to protection port" in a CALL_REJECTED_CAUSE cause IE.

When failing a call (either on the host or within the network 12) the UNI signalling specification does not mandate nor even suggest including the location of the failure in any call rejection message (RELEASE, RELEASE COMPLETE, ADD PARTY REJECT). There was however a requirement to include the reason for the failure.

The information about the reason for the call failure is encoded in an information element called the Cause Information Element.

This information element describes the reason for generating certain messages (call failure messages being the major ones). It provides diagnostic information in the event of procedural errors, and (in a very low granularity manner) indicates the location of the fault. The UNI 3.x and 4.0 specifications allow the cause information element to be repeated in a message.

The encoding of the cause IE is of the form

| Bits | |
|---|---|
| 8 | Info Element Identifier |
| 8 | Coding Standard and instruction Field |
| 16 | Length of cause value |
| 8 | 4 spare + 4 Location |
| 8 | Cause Value |
| * | Diagnostics (if any). |

The location field gives a very low level of granularity location, it can take the value "user", "private network", "public network", "transit network" . . . .

There are a large number of predefined cause values, some of which include additional information (this additional information is referred to as a diagnostic) others merely a code, for example, "no route to destination".

The cause information element may be repeated twice in any message for which it is valid. It is this allowance in the protocol which is exploited in providing the call failure location feature.

The maximum length of a cause information element is 34 bytes. This leaves a maximum of 28 bytes for any diagnostic.

Switches and end-stations generate an additional cause information element upon call rejection. This additional cause IE has the "Call Rejected" cause, the Forum signalling specifications allow this cause value to contain a user specified diagnostic (read proprietary) field. The intent of a "user specified" value is that an end user may provide an application specific reason for a call rejection. The use of this value by a network 12 element was most likely never intended when the requirement for a "user specified" diagnostic was introduced. If the failure or rejection message already contains a "Call Rejected" cause, a new one is not added.

This extra cause information is carried transparently by both Marconi switches and other vendors switches to the calling device.

The diagnostic field may be up to 28 bytes long (the cause IE may be up to 34 bytes long, however the overhead prior to the diagnostic field uses 7 bytes). Some very useful information may be conveyed in this field. This cause value may be used in conjunction with the existing cause value that is already generated indicating the reason for call failure.

The diagnostic field contained within the cause IE contains the following information:

```
        Bits
     8 7 6 5 4 3 2 1    Octets
    +-----------------+
    | Rej Reason| Cond|
    |1 0 0 0 0 0| 0 0 |  1
    +-----------------+
    |   FORE OUI      |  2 Note 1
    | 0 0 0 0 0 0 0 0 |
    +-----------------+
    | FORE OUI (cont) |  3
    | 0 0 1 0 0 0 0 0 |
    +-----------------+
    | FORE OUI (cont) |  4
    | 0 1 0 0 1 0 0 0 |
    +-----------------+
    |Call Fail ID| Loc|  5  Call Failure
    |            |    |     Location
    | 1 0 0 0 0 1|x x |     Identifer
    +-----------------+
    |    Link ID      |  5.1 Note 2
    +-----------------+
    | Link ID (cont)  |  5.2
    +-----------------+

+-----------------+
    |      VPI        |  5.3 Note 3
    +-----------------+
    |   VPI (cont)    |  5.4
    +-----------------+
    |Prefix ID | Type |  6 Note 4   Switch NSAP
    |          |      |              Prefix
    | 1 0 0 0 1 0|x x |              Identifier
    +-----------------+
    |   NSAP Prefix   |  6.1-6.13 Note 5
    +-----------------+
```

Call Failure Location (octet 4)

| Bits | |
|---|---|
| 2 1 | Meaning |
| 0 0 | Call failure downstream |
| 0 1 | Call failure at this device |

NSAP Prefix Type (octet 5)

| Bits | |
|---|---|
| 2 1 | Meaning |
| 0 0 | Default prefix |

Note 1. This also serves as a unique identifer within the "user diagnostic" space for a CALL REJECTED cause.
Note 2. The link identifier associated with the call that was cleared.
Note 3. The VPI identifier associated with the call that was cleared.
Note 4. The NSAP Prefix Ident indicates that the 13 byte default prefix follows. The prefix is always 13 bytes, so this is encoded as 10001000 (0x88).
Note 5. The NSAP prefix of the switch that generated is this information element. This is not necessarily the device which failed the call, since the call may have failed downstream of this switch.

If the message already contains a cause information element encoded with the "Call Rejected" cause the node transparently transports this IE in the clearing message sent to the calling user.

If the message does not contain a cause information element encoded with the "Call Rejected" cause, and the "fail-locate" feature is enabled, the node generates a "Call Rejected" cause value, fills in the Fore diagnostic field and transports this IE in the clearing message sent to the calling user.

Within the Fore diagnostic the Local/Remote indicator is set to "Call failure Downstream". The upstream call reference, VPI and link 30 identifier is included within the diagnostic.

The node adds a "Call Rejected" cause value containing a Diagnostic Field to the call failure message. Within the diagnostic the Local/Remote indicator is set to "Call failure at this device". The upstream call reference, VPI and link 30 identifier are included within the diagnostic.

The Call Fail ID information that is part of the Diagnostics field of the cause IE will be used for the redirection feature. Whenever the destination needs to tell source switch to redirect a call to the protection port it will build a Call Rejected IE with the diagnostic built as before except the octet 5 of the diagnostic will have a value "100011xx". This information in the diagnostic will be enough for the source switch to redirect an SPVxC call to the protection port.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for responding to destination failures involving SPVx (switched-permanent virtual circuit) connections comprising:
    a primary source node;
    a primary source switch for producing an SPVx connection, the primary source node in communication with the primary source switch;
    a primary destination node;
    a primary destination switch for receiving the SPVx connection, the primary destination node in communication with the primary destination switch, the connection following a primary path between the primary source node and the primary destination node;
    an alternate destination node, the primary destination switch redirecting automatically the primary connection to the alternate destination node along an alternate path when the primary destination switch detects a failure of the primary path, the alternate path formed by the primary source node and the alternate destination node only after the primary path experiences a failure, the primary destination switch releases the SPVx connection after there is a fault detected on the primary path, the primary source switch makes multiple attempts to reestablish the SPVx connection with the primary destination node after a failure is detected on the primary path, the primary source switch redirects automatically the SPVx connection to the alternate destination node, the primary source switch re-establishes the SPVx connection to the primary destination node when the failure condition clears.

2. A system for responding to failures involving SPVx (switched-permanent virtual circuit) connections comprising:
    a primary source node;
    a primary source switch for producing an SPVx connection, the primary source node in communication with the primary source switch;
    a primary destination node;
    a primary destination switch for receiving the SPVx connection, the primary destination node in communication with the primary destination switch, the connection following a primary path between the primary source node and the primary destination node;
    an alternate source switch; and
    an alternate source node in communication with the alternate source switch, the alternate source switch re-establishing automatically the connection to the primary destination node along an alternate path when the primary source switch detects a failure of the primary path, the alternate path formed by the alternate source node and the primary destination node only after the primary path experiences a failure, the primary source switch in communication with the alternate source switch to identify to the alternate source switch there is a failure in regard to the primary path, the alternate source switch re-establishes the SPVx connection from the primary source node to the primary destination node when the failure clears.

3. A system as described in claim 2 wherein the alternate source switch re-establishes the SPVx connection from the alternate source node to the primary destination node when a link between the primary source node and the primary source switch fails.

4. A system as described in claim 2 wherein the alternate source switch re-establishes the SPVx connection from the alternate source node to the primary destination node when the primary switch fails.

5. A system as described in claim 4 wherein the primary source node re-establishes the SPVx connection from the primary source node to the primary destination node if the failure has cleared.

6. A method for responding to failures involving SPVx (switched-permanent virtual circuit) connections comprising the steps of:
    forming an SPVx connection between a primary source node and a primary destination node;
    detecting a failure on a primary path having the primary source node;
    communicating between a primary source switch in communication with the primary source node and an alternate source switch in communication with an alternate source node to identify to the alternate source switch there is a failure in regard to the primary source node;
    re-establishing automatically the SPVx connection with the alternate source node along an alternate path having the primary destination node; and
    re-establishing the SPVx connection from the primary source switch to the primary destination node after the failure has cleared.

7. A method as described in claim 6 wherein the re-establishing step includes the step of re-establishing the SPVx connection from the alternate source node to the primary destination node when the primary source node fails.

8. A method as described in claim 7 wherein the re-establishing step includes the step of re-establishing the SPVx connection from the alternate source node to the primary destination node when a link between the primary source node and the primary source switch fails.

9. A method as described in claim 6 wherein the re-establishing step includes the step of re-establishing the SPVx connection from the alternate source node to the primary destination node when the primary source switch fails.

10. A method for responding to failures of connections in a network comprising the steps of:

establishing a single end-to-end connection across a network between a primary source node and a primary destination node with multiple re-route options;

experiencing a failure in the connection;

re-routing the connection across the network between the primary source node and an alternate destination node along one of the multiple re-route options by maintaining just one end-to-end connection between the primary source node and the primary destination node;

trying to restore the SPVx connection with the primary destination node; and re-establishing the end-to-end connection through the primary source switch when the failure clears.

11. A method as described in claim 10 wherein the experiencing step includes the step of detecting a failure in the primary destination node; and the re-routing step includes the step of redirecting automatically the connection to an alternate destination node.

12. A method as described in claim 11 wherein the detecting step includes the step of detecting a failure of the primary destination node.

13. A method as described in claim 12 including the step of releasing the SPVx connection by the primary destination node.

14. A method as described in claim 13 wherein the redirecting step includes the step of redirecting automatically by the primary source node the SPVx connection to the alternate destination node.

15. A method as described in claim 14 including the step of configuring failure codes that trigger a redirection of the SPVx connections.

16. A method as described in claim 15 including the steps of making multiple attempts to reestablish the connection with the primary destination node.

17. A method as described in claim 10 wherein the experiencing step includes the step of detecting a failure on a primary path having the primary source node and the re-routing step includes the step of redirecting automatically the connection along an alternate path having the primary destination node.

18. A method as described in claim 17 including the step of communicating between a primary source switch in communication with the primary source node and a alternate source switch in communication with an alternate source node to identify to the alternate source switch there is a failure in regard to the primary source node.

19. A method as described in claim 18 wherein the re-establishing step includes the step of re-establishing the connection from the alternate source node to the primary destination node when the primary source node fails.

20. A method as described in claim 18 wherein the re-establishing step includes the step of re-establishing the connection from the alternate source node to the primary destination node when a link between the primary source node and the primary source switch fails.

21. A method as described in claim 18 wherein the re-establishing step includes the step of re-establishing the connection from the alternate source node to the primary destination node when the primary source switch fails.

22. A system for responding to failures involving SPVx (switched-permanent virtual circuit) connections comprising:

a primary source node;

a primary source switch for producing an SPVx connection, the primary source node in communication with the primary source switch;

a primary destination node;

a primary destination switch for receiving the SPVx connection, the primary destination node in communication with the primary destination switch, the connection following a primary path between the primary source node and the primary destination node;

an alternate source switch;

an alternate source node in communication with the alternate source switch, the alternate source switch re-establishing automatically the connection to the primary destination node along an alternate path when the primary source switch detects a failure of the primary path, the alternate path formed by the alternate source node and the primary destination node only after the primary path experiences a failure, the primary source switch in communication with the alternate source switch to identify to the alternate source switch there is a failure in regard to the primary path, the alternate source switch re-establishes the SPVx connection from the alternate source node to the primary destination node when the primary switch fails; and a network, and wherein the alternate source switch re-establishes the SPVx connection from the primary source switch to the primary destination node through the alternate source switch and a primary portion of the alternate path through the network when a primary portion of the primary path through the network fails.

23. A system for responding to failures involving SPVx (switched-permanent virtual circuit) connections comprising:

a primary source node;

a primary source switch for producing an SPVx connection, the primary source node in communication with the primary source switch;

a primary destination node;

a primary destination switch for receiving the SPVx connection, the primary destination node in communication with the primary destination switch, the connection following a primary path between the primary source node and the primary destination node;

an alternate source switch;

an alternate source node in communication with the alternate source switch, the alternate source switch re-establishing automatically the connection to the primary destination node along an alternate path when the primary source switch detects a failure of the primary path, the alternate path formed by the alternate source node and the primary destination node only after the primary path experiences a failure, the primary source switch in communication with the alternate source switch to identify to the alternate source switch there is a failure in regard to the primary path; and a network, and wherein the alternate source switch re-establishes the SPVx connection from the alternate source switch to the primary source switch to the primary destination node through a primary portion of the primary path through the network when the primary source node fails and a primary portion of the alternate path through the network fails.

24. A method for responding to failures involving SPVx (switched-permanent virtual circuit) connections comprising the steps of:

forming an SPVx connection between a primary source node and a primary destination node;
detecting a failure on a primary path having the primary source node;
communicating between a primary source switch in communication with the primary source node and an alternate source switch in communication with an alternate source node to identify to the alternate source switch there is a failure in regard to the primary source node;
re-establishing automatically the SPVx connection with the alternate source node along an alternate path having the primary destination node; and
re-establishing the SPVx connection from the primary source switch through the alternate source switch to the primary destination node through a primary portion of the alternate path of a network when a primary portion of the primary path through the network fails.

25. A method for responding to failures involving SPVx (switched-permanent virtual circuit) connections comprising the steps of:
forming an SPVx connection between a primary source node and a primary destination node;
detecting a failure on a primary path having the primary source node;
communicating between a primary source switch in communication with the primary source node and an alternate source switch in communication with an alternate source node to identify to the alternate source switch there is a failure in regard to the primary source node;
re-establishing automatically the SPVx connection with the alternate source node along an alternate path having the primary destination node; and
re-establishing the SPVx connection from the alternate source switch through the primary source switch to the primary destination node through a primary portion of the primary path when the primary source fails and a primary portion of the alternate path through the network fails.

26. A method for responding to failures of connections in a network comprising the steps of:
establishing a single end-to-end connection across a network between a primary source node and a primary destination node with multiple re-route options;
experiencing a failure in the connection including the step of detecting a failure on a primary path having the primary source node;
communicating between a primary source switch in communication with the primary source node and a alternate source switch in communication with an alternate source node to identify to the alternate source switch there is a failure in regard to the primary source node; and
re-routing the connection across the network along one of the multiple re-route options by maintaining just one end-to-end connection between the primary source node and the primary destination node including the step of redirecting automatically the connection along an alternate path having the primary destination node.

27. A method for responding to failures of connections in a network comprising the steps of:
establishing a single end-to-end connection across a network between a primary source node and a primary destination node with multiple re-route options;
experiencing a failure in the connection including the step of detecting a failure on a primary path having the primary source node;
communicating between a primary source switch in communication with the primary source node and a alternate source switch in communication with an alternate source node to identify to the alternate source switch there is a failure in regard to the primary source node; and
re-routing the connection across the network along one of the multiple re-route options by maintaining just one end-to-end connection between the primary source node and the primary destination node including the step of re-establishing the connection from the alternate source switch to the primary source switch to the primary destination node through a primary portion of the primary path when the primary source node fails and a secondary portion of the alternate path through the network fails.

* * * * *

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

Column 23, line 28, insert attached Appendix which was omitted from the patent.

UNITED STATES PATENT AND TRADEMARK OFFICE
CERTIFICATE OF CORRECTION

| | | |
|---|---|---|
| PATENT NO. | : 7,313,087 B2 | |
| APPLICATION NO. | : 10/600184 | |
| DATED | : December 25, 2007 | |
| INVENTOR(S) | : Lingaraj S. Patil et al. | |

It is certified that error appears in the above-identified patent and that said Letters Patent is hereby corrected as shown below:

The MIB for SPVxC Call Redirection Information.

```
pnniSpvxSrcRedirectionTable  OBJECT-TYPE
        SYNTAX  SEQUENCE OF  PnniSpvxSrcRedirectionEntry
        MAX-ACCESS  not-accessible
        STATUS  current
        DESCRIPTION
                "This table contains information about Redirection SPVCs
                (Smart Permanent Virtual Circuits) that have their source
                on this switch. This table is similar to the
                pnniSpvcSrcTable, but the important difference is that
                it stores 2 sets of SPVC parameters:  primary and secondary.
                When configured, one set of parameters will be used to set
                up the SPVC, while the other set will be used in the event
                of a switchover."
        : : =    {  q2931Group  23  } pnniSpvxSrcRedirectionEntry  OBJECT-TYPE
        SYNTAX  PnniSpvxSrcRedirectionEntry
        MAX-ACCESS         not-accessible
        STATUS  current
        DESCRIPTION
                "A table entry containing SPVCC resilient
                destination info."

INDEX {   pnniSpvxSrcRedirectionIndex  }
        : : =   {  pnniSpvxSrcRedirectionTable  1  }

PnniSpvxSrcRedirectionEntry   : : =  SEQUENCE  {
        pnniSpvxSrcRedirectionIndex                     Integer32,
        pnniSpvxSrcRedirectionCalledAtmAddr    NsapAddr,
        pnniSpvxSrcRedirectionVPVCSel              INTEGER,
        pnniSpvxSrcRedirectionCalledVpi           Integer32,
        pnniSpvxSrcRedirectionCalledVci           Integer32,
        pnniSpvxSrcRedirectionFwdUpcKey                 Integer32,
        pnniSpvxSrcRedirectionBckUpcKey                 Integer32,
        pnniSpvxSrcRedirectionFwdQosClass    INTEGER,
        pnniSpvxSrcRedirectionBckQosClass    INTEGER,
        pnniSpvxSrcRedirectionName                OCTET  STRING,
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
        pnniSpvxSrcRedirectionQosIndex          Integer32,
        pnniSpvxSrcRedirectionRerouteStatus     INTEGER,
        pnniSpvxSrcRedirectionBackoffStatus     INTEGER,
        pnniSpvxSrcRedirectionDtlTag            Integer32,
        pnniSpvxSrcRedirectionAutoDtlStatus     INTEGER
} pnniSpvxSrcRedirectionIndex   OBJECT-TYPE
              SYNTAX      Integer32
              MAX-ACCESS         read-create
              STATUS   current
              DESCRIPTION
                     "The value of this object uniquely identifies the
                     SPVCC Call Redirection information."
              : : =  {  pnniSpvxSrcRedirectionEntry   1  } pnniSpvxSrcRedirectionCalledAtmAddr   OBJECT-TYPE
              SYNTAX   NsapAddr
              MAX-ACCESS   read-create
              STATUS   current
              DESCRIPTION
                     "The ATM address of the distant end NI   (remote
                     switch) used for Call Redirection."
              : : =  {  pnniSpvxSrcRedirectionEntry  2  } pnniSpvxSrcRedirectionVPVCSel  OBJECT-TYPE
        SYNTAX      INTEGER
        MAX-ACCESS         read-only
        STATUS        current
        DESCRIPTION
                     "The Called VPI/VCI value selection qualifier."
        : : =  {  pnniSpvxSrcRedirectionEntry  3  } pnniSpvxSrcRedirectionCalledVpi  OBJECT-TYPE
              SYNTAX      Integer32
              MAX-ACCESS     read-create
              STATUS   current
              DESCRIPTION
                     "The VPI to be used at the Called NI."
              : : =  {  pnniSpvxSrcRedirectionEntry  4  }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
pnniSpvxSrcRedirectionCalledVci   OBJECT-TYPE
        SYNTAX      Integer32
        MAX-ACCESS       read-create
        STATUS      current
        DESCRIPTION
              "The VCI to be used at the Called NI."
        : : =  {  pnniSpvxSrcRedirectionEntry  5  } pnniSpvxSrcRedirectionFwdUpcKey  OBJECT-TYPE
        SYNTAX   Integer32
        MAX-ACCESS   read-create
        STATUS   current
        DESCRIPTION
              "The forward UPC traffic contract key.
               This key must be defined in the upcContractTable."
        : : =   {   pnniSpvxSrcRedirectionEntry  6  } pnniSpvxSrcRedirectionBckUpcKey   OBJECT-TYPE
        SYNTAX   Integer32
        MAX-ACCESS   read-create
        STATUS   current
        DESCRIPTION
              "The Backward UPC traffic contract key.
               This key must be defined in the upcContractTable."

: : =   {   pnniSpvxSrcRedirectionEntry  7  } pnniSpvxSrcRedirectionFwdQosClass   OBJECT-TYPE
        SYNTAX    INTEGER  {
                          class0 (1),
                          class1 (2),
                          class2 (3),
                          class3 (4),
                          class4 (5)
               }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
        MAX-ACCESS        read-create
        STATUS    current
        DESCRIPTION
                "The requested quality of service in
                the forward (calling to called) direction."
        : : = {  pnniSpvxSrcRedirectionEntry  8  } pnniSpvxSrcRedirectionBckQosClass   OBJECT-TYPE
        SYNTAX   INTEGER {
                        class0 (1),
                        class1 (2),
                        class2 (3),
                        class3 (4),
                        class4 (5)
                }
        MAX-ACCESS   read-create
        STATUS   current
        DESCRIPTION
                "The requested quality of service in
                the backward (called to calling) direction."
        : : = {  pnniSpvxSrcRedirectionEntry  9  } pnniSpvxSrcRedirectionName  OBJECT-TYPE
        SYNTAX   OCTET  STRING  (SIZE(0 . .32))
        MAX-ACCESS   read-create
        STATUS   current
        DESCRIPTION
                "The value of this object identifies the
                name that has been assigned."
        : : = {  pnniSpvxSrcRedirectionEntry  10  }
```

UNITED STATES PATENT AND TRADEMARK OFFICE
CERTIFICATE OF CORRECTION

PATENT NO.         : 7,313,087 B2
APPLICATION NO.    : 10/600184
DATED              : December 25, 2007
INVENTOR(S)        : Lingaraj S. Patil et al.

It is certified that error appears in the above-identified patent and that said Letters Patent is hereby corrected as shown below:

```
pnniSpvxSrcRedirectionQosIndex  OBJECT-TYPE
        SYNTAX   Integer32
        MAX-ACCESS   read-create
        STATUS   current
        DESCRIPTION
                "The index for the QOS Class Expansion Table to be used."
        : : =  {  pnniSpvxSrcRedirectionEntry  11  } pnniSpvxSrcRedirectionRerouteStatus  OBJECT-TYPE
        SYNTAX INTEGER    {
                                enabled (1),
                                disabled (2)
                        }
        MAX-ACCESS       read-create
        STATUS current
        DESCRIPTION
                "The status of the reroute function. If set to
                disabled (2), no rerouting will be attempted."
        DEFVAL  {  disabled  }
        : : =  {  pnniSpvxSrcRedirectionEntry  12  } pnniSpvxSrcRedirectionBackoffStatus  OBJECT-TYPE
        SYNTAX INTEGER    {
                                enabled (1),
                                disabled (2)
                        }
        MAX-ACCESS       read-create
        STATUS current
        DESCRIPTION
                "The status of the backoff function.  If set to
                disabled (2), directed dtls configured will be
                continually retried on failure."
        DEFVAL  {  enabled   }
        : : = {  pnniSpvxSrcRedirectionEntry 13  }
```

UNITED STATES PATENT AND TRADEMARK OFFICE
CERTIFICATE OF CORRECTION

PATENT NO.         : 7,313,087 B2
APPLICATION NO.    : 10/600184
DATED              : December 25, 2007
INVENTOR(S)        : Lingaraj S. Patil et al.

It is certified that error appears in the above-identified patent and that said Letters Patent is hereby corrected as shown below:

```
pnniSpvxSrcRedirectionDtlTag  OBJECT-TYPE
        SYNTAX      Integer32
        MAX-ACCESS      read-create
        STATUS    current
        DESCRIPTION
                "This value specifies an index into a table of DTLs,
                the DTL entries in this table will be used to setup
                the SPVC."
        ::= { pnniSpvxSrcRedirectionEntry 14 } pnniSpvxSrcRedirectionAutoDtlStatus  OBJECT-TYPE
        SYNTAX INTEGER  {
                    enabled (1),
                    disabled (2)
                }
        MAX-ACCESS         read-create
        STATUS  current
        DESCRIPTION
                "The status of the dynamic path selection function.  If set
                to disabled (2), auto path selection will not be used."
        DEFVAL { enabled }
        ::= { pnniSpvxSrcRedirectionEntry 15 }
```

Modifications done to PNNI SPVCC source side MIB.

--------------------------------------------------------------------------------------------------------------

```
--
-- PNNI  SPVCC  source-side definitions
-- pnniSpvcSrcTable  OBJECT-TYPE
        SYNTAX  SEQUENCE OF PnniSpvcSrcEntry
        MAX-ACCESS  not-accessible
        STATUS  current
        DESCRIPTION
                "This table contains information about SPVCCs (Smart
                Permanent Virtual Channel Connections) that have their source
                at this switch."
        ::= { q2931Group 3 }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
pnniSpvcSrcEntry  OBJECT-TYPE
      SYNTAX   PnniSpvcSrcEntry
      MAX-ACCESS  not-accessible
      STATUS  current pnniSpvcSrcSpvxRedirectionIndex   OBJECT-TYPE
      SYNTAX   Integer32
      MAX-ACCESS   read-create
      STATUS         current
      DESCRIPTION
            "The index of the Call Redirection information used
            for providing SPVCC resiliency."
      : : =  {   pnniSpvcSrcEntry  53  } pnniSpvcSrcSpvxRedirectionDest  OBJECT-TYPE
      SYNTAX        INTEGER  {
                  directed2primary (1),
                  directed2secondary (2)
            }
      MAX-ACCESS   read-only
      STATUS         current
      DESCRIPTION
            "The status of a resilient SPVCC indicating whether
            the primary destination or secondary destination is
            active at a given time."
      : : =  {   pnniSpvcSrcEntry  54  }
```

Modifications done to PNNI SPVPC source side MIB.

------------------------------------------------------------------------------------------------------------
-- The source side table for configuring originating SPVPCs
------------------------------------------------------------------------------------------------------------

UNITED STATES PATENT AND TRADEMARK OFFICE
CERTIFICATE OF CORRECTION

| | |
|---|---|
| PATENT NO. | : 7,313,087 B2 |
| APPLICATION NO. | : 10/600184 |
| DATED | : December 25, 2007 |
| INVENTOR(S) | : Lingaraj S. Patil et al. |

It is certified that error appears in the above-identified patent and that said Letters Patent is hereby corrected as shown below:

```
pnniSpvpcSrcTable  OBJECT-TYPE
        SYNTAX   SEQUENCE OF PnniSpvpcSrcEntry
        MAX-ACCESS   not-accessible
        STATUS   current
        DESCRIPTION
                "This table contains information about SPVPCs  (Smart
                Permanent Virtual Path Connections) that have their
                source at this switch. This table serves the same
                function that the pnniSpvcSrcTable serves for SPVCCs."
        : : =  {  q2931Group   9  } pnniSpvpcSrcEntry  OBJECT-TYPE
        SYNTAX   PnniSpvpcSrcEntry
        MAX-ACCESS   not-accessible
        STATUS   current
        DESCRIPTION
                "A table entry containing source SPVPC  {Smart
                Permanent Virtual Path Connection)  information."
        INDEX         {   pnniSpvpcSrcIndex  }
        : : =  {   pnniSpvpcSrcTable  1   }

PnniSpvpcSrcEntry : : =  SEQUENCE  {
            pnniSpvpcSrcIndex                   INTEGER,
            pnniSpvpcSrcCallingPort             INTEGER,
            pnniSpvpcSrcCallingVPI              Integer32,
            pnniSpvpcSrcCalledAtmAddr           NsapAddr,
            pnniSpvpcSrcCalledPort              Integer32,
            pnniSpvpcSrcCalledVPVCSel           INTEGER,
            pnniSpvpcSrcCalledVPI               INTEGER,
            pnniSpvpcSrcCalledAssignedVPI       INTEGER,
            pnniSpvpcSrcFwdUpcKey               INTEGER,
            pnniSpvpcSrcBckUpcKey               INTEGER,
            pnniSpvpcSrcSusceptClip             INTEGER,
            pnniSpvpcSrcFwdQoSClass             INTEGER,
            pnniSpvpcSrcBckQoSClass             INTEGER,
            pnniSpvpcSrcLastFailCause           DisplayString,
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
            pnniSpvpcSrcRetryCount          Integer32,
            pnniSpvpcSrcLastChangeTime      TimeTicks,
            pnniSpvpcSrcStatus              INTEGER,
            pnniSpvpcSrcName                OCTET   STRING,
            pnniSpvpcSrcRowStatus           RowStatus,
            pnniSpvpcSrcRouteCost           Integer32,
            pnniSpvpcSrcRerouteStatus       INTEGER,
            pnniSpvpcSrcCallingDomain       Integer32,
            pnniSpvpcSrcQosIndex            Integer32,
            pnniSpvpcSrcPriority            Integer32,
            pnniSpvpcSrcLastLocation        DisplayString,
            pnniSpvpcSrcOldRouteCost        Integer32,
            pnniSpvpcSrcDownReason          INTEGER,
            pnniSpvpcSrcBackoffStatus       INTEGER,
            pnniSpvpcSrcActiveDtlNodeIndex  Integer32,
            pnniSpvpcSrcActiveDtlIndex      Integer32,
            pnniSpvpcSrcDtlTag              Integer32,
            pnniSpvpcSrcAutoDtlStatus       INTEGER,
            pnniSpvpcSrcRGroupIndex         INTEGER,
            pnniSpvpcSrcSecondaryVPI        Integer32,
            pnniSpvpcSrcSpvxRedirectionIndex Integer32,
            pnniSpvpcSrcSpvxRedirectionDest  INTEGER
    } pnniSpvpcSrcSpvxRedirectionIndex    OBJECT-TYPE
        SYNTAX      Integer32
        MAX-ACCESS          read-create
        STATUS              current
        DESCRIPTION "The index of the Call Redirection information used
            for providing SPVPC resiliency."
        ::=     {pnniSpvpcSrcEntry  36  }
```

UNITED STATES PATENT AND TRADEMARK OFFICE
CERTIFICATE OF CORRECTION

PATENT NO.         : 7,313,087 B2
APPLICATION NO. : 10/600184
DATED              : December 25, 2007
INVENTOR(S)       : Lingaraj S. Patil et al.

It is certified that error appears in the above-identified patent and that said Letters Patent is hereby corrected as shown below:

```
pnniSpvpcSrcSpvxRedirectionDest    OBJECT-TYPE
        SYNTAX       INTEGER  {
                        directed2primary (1),
                        directed2secondary (2)
                  }
        MAX-ACCESS         read-only
        STATUS             current
        DESCRIPTION
                "The status of a resilient SPVPC indicating whether
                the primary destination or secondary destination is
                active at a given time."
        ::=  {  pnniSpvpcSrcEntry  37  }
```

Trap when a switchover from primary to secondary destination takes place.

```
pnniSpvccRedirectionSwover    NOTIFICATION-TYPE
        OBJECTS   {
                        pnniSpvcSrcIndex,
                        pnniSpvcSrcSpvxRedirectionDest,
                        trapLogIndex  }
        STATUS             current
        DESCRIPTION
                "This trap is sent when a switch over of an SPVCC
                from primary to secondary (or vice-versa) takes place."
        ::=  {  atmSwitch  0  2029  } pnniSpvpcRedirectionSwover    NOTIFICATION-TYPE
        OBJECTS   {
                        pnniSpvpcSrcIndex,
                        pnniSpvpcSrcSpvxRedirectionDest,
                        trapLogIndex  }
```

UNITED STATES PATENT AND TRADEMARK OFFICE
CERTIFICATE OF CORRECTION

| | | |
|---|---|---|
| PATENT NO. | : 7,313,087 B2 | |
| APPLICATION NO. | : 10/600184 | |
| DATED | : December 25, 2007 | |
| INVENTOR(S) | : Lingaraj S. Patil et al. | |

It is certified that error appears in the above-identified patent and that said Letters Patent is hereby corrected as shown below:

```
        STATUS      current
        DESCRIPTION
                "This trap is sent when a switch over of an SPVPC
                from primary to secondary (or vice-versa) takes place."
    ::= { atmSwitch 0 2030 }
```

The MIB for Source SPVC Call Resiliency Information. This table is used for pp SPVCs only.

```
pnniSpvcSrcResiliencyTable   OBJECT-TYPE
        SYNTAX  SEQUENCE OF pnniSpvcSrcResiliencyEntry
        MAX-ACCESS not-accessible
        STATUS      current
        DESCRIPTION
                "This table contains information about Source Resilient SPVCs
                (Smart Permanent Virtual Circuits) that have their source
                on this switch. This table is stores the Source Resiliency information,
                which is used to poll the partner SPVC's status."
    ::= {q2931Group  27 } pnniSpvcSrcResiliencyEntry   OBJECT-TYPE
        SYNTAX       pnniSpvcSrcResiliencyEntry
        MAX-ACCESS          not-accessible
        STATUS       current
        DESCRIPTION
                "A table entry containing source resilient SPVCC resilient
                info."

INDEX   { pnniSpvcSrcResiliencyIndex }
    ::=   {   pnniSpvcSrcResiliencyTable 1 }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
pnniSpvcSrcResiliencyEntry ::= SEQUENCE  {
        pnniSpvcSrcResiliencyIndex              Integer32,
        pnniSpvcSrcResiliencySigIf              Integer32,
        pnniSpvcSrcResiliencySigIfVpi           Integer32,
        pnniSpvcSrcResiliencyIlmiState          INTEGER,
        pnniSpvcSrcResiliencyRole               INTEGER,
        pnniSpvcSrcResiliencyDeadSilenceTimer   INTEGER,
        pnniSpvcSrcResiliencyName               DisplayString,
} pnniSpvcSrcResiliencyIndex         OBJECT-TYPE
        SYNTAX      Integer32
        MAX-ACCESS     read-create
        STATUS   current
        DESCRIPTION
                "The value of this object uniquely identifies source
                resilient SPVCC Call information."
        ::=  {  pnniSpvcSrcResiliency  1  } pnniSpvcSrcResiliencySigIf   OBJECT-TYPE
        SYNTAX       INTEGER
        MAX-ACCESS   read-write
        STATUS   current
        DESCRIPTION
                "The value of this object identifies the
                signaling vpi that is on the atmif connecting this switch to the
                partner switch."
        ::=  {  pnniSpvcSrcResiliencyEntry  2  } pnniSpvcSrcResiliencySigIfVpi    OBJECT-TYPE
        SYNTAX       Integer32
        MAX-ACCESS           read-write
        STATUS          current
        DESCRIPTION
                "The value of this object identifies the
                signaling vpi that is on the atmif connecting this switch to the
                partner switch."
        ::=  { pnniSpvcSrcResiliencyEntry  3  }
```

UNITED STATES PATENT AND TRADEMARK OFFICE
CERTIFICATE OF CORRECTION

PATENT NO.       : 7,313,087 B2
APPLICATION NO.  : 10/600184
DATED            : December 25, 2007
INVENTOR(S)      : Lingaraj S. Patil et al.

It is certified that error appears in the above-identified patent and that said Letters Patent is hereby corrected as shown below:

```
pnniSpvcSrcResiliencyIlmiState   OBJECT-TYPE
       SYNTAX   Integer32
       MAX-ACCESS   read-write
       STATUS   current
       DESCRIPTION
              "The value of this object identifies the
              ILMI oper status for the signaling interface on which ILMI
              queries are done."
       : : =  { pnniSpvcSrcResiliencyEntry  4 } pnniSpvcSrcResiliencyRole   OBJECT-TYPE
       SYNTAX   INTEGER   { primary (1),
                            Secondary (2) }
       MAX-ACCESS   read-write
       STATUS   current
       DESCRIPTION
              "The value of this object identifies the
              role of the source resilient SPVC using this index."
       : : =  { pnniSpvcSrcResiliencyEntry  5 } pnniSpvcSrcResiliencyDeadSilenceTimer      OBJECT-TYPE
       SYNTAX   INTEGER   { enable (1),
                            Disable (2) }
       MAX-ACCESS   read-write
       STATUS   current
       DESCRIPTION
              "The value of this object indicates whether the Dead Silence
              timer counting is enabled for SPVCs associated with this or
              not"."
       : : =  { pnniSpvcSrcResiliencyEntry  6 } pnniSpvcSrcResiliencyName      OBJECT-TYPE
       SYNTAX   DisplayString   (SIZE (0 . .31))
       MAX-ACCESS   read-write
       STATUS   current
       DESCRIPTION
              "The value of this object identifies the
              name that has been assigned."
       : : =  { pnniSpvcSrcResiliencyEntry  7 }
```

UNITED STATES PATENT AND TRADEMARK OFFICE
CERTIFICATE OF CORRECTION

| | |
|---|---|
| PATENT NO. | : 7,313,087 B2 |
| APPLICATION NO. | : 10/600184 |
| DATED | : December 25, 2007 |
| INVENTOR(S) | : Lingaraj S. Patil et al. |

It is certified that error appears in the above-identified patent and that said Letters Patent is hereby corrected as shown below:

Modifications done to PNNI SPVCC source side MIB.

---

```
--
-- PNNI  SPVCC  source-side  definitions
--
Similar additions will be done to pnniSpvcAltSrcTable pnniSpvcSrcTable  OBJECT-TYPE
        SYNTAX   SEQUENCE OF pnniSpvcSrcEntry
        MAX-ACCESS   not-accessible
        STATUS   current
        DESCRIPTION
                "This table contains information about SPVCCs  (Smart
                Permanent Virtual Channel Connections)  that have their source
                at this switch."
        : : =   {  q2931Group   3   } pnniSpvcSrcEntry   OBJECT-TYPE
        SYNTAX   pnniSpvcSrcEntry
        MAX-ACCESS  not-accessible
        STATUS   current
        DESCRIPTION
                "A table entry containing source SPVCC   {Smart
                Permanent Virtual Channel Connections)  information."
        INDEX          {  pnniSpvcSrcIndex  }
        : : =  {  pnniSpvcSrcTable  1  }
```

UNITED STATES PATENT AND TRADEMARK OFFICE
CERTIFICATE OF CORRECTION

| | | |
|---|---|---|
| PATENT NO. | : 7,313,087 B2 | |
| APPLICATION NO. | : 10/600184 | |
| DATED | : December 25, 2007 | |
| INVENTOR(S) | : Lingaraj S. Patil et al. | |

It is certified that error appears in the above-identified patent and that said Letters Patent is hereby corrected as shown below:

```
pnniSpvcSrcEntry ::= SEQUENCE   {
         pnniSpvcSrcIndex                  Integer32,
         pnniSpvcSrcCallingPort            Integer32,
         pnniSpvcSrcCallingVPI             Integer32,
         pnniSpvcSrcCallingVCI             Integer32,
         pnniSpvcSrcCalledAtmAddr          NsapAddr,
         pnniSpvcSrcCalledPort             Integer32,
         pnniSpvcSrcCalledVPVCSel          INTEGER,
         pnniSpvcSrcCalledVPI              Integer32,
         pnniSpvcSrcCalledVCI              Integer32,
         pnniSpvcSrcCalledAssignedVPI      Integer32,
         pnniSpvcSrcCalledAssignedVCI      Integer32,
         pnniSpvcSrcFwdUpcKey              Integer32,
         pnniSpvcSrcBckUpcKey              Integer32,
         pnniSpvcSrcBearerClass            INTEGER,
         pnniSpvcSrcTrafficType            INTEGER,
         pnniSpvcSrcTimingReq              INTEGER,
         pnniSpvcSrcSusceptClip            INTEGER,
         pnniSpvcSrcFwdQoSClass            INTEGER,
         pnniSpvcSrcBckQoSClass            INTEGER,
         pnniSpvcSrcTransitNetSel          TransitNetwork,
         pnniSpvcSrcLastFailCause          DisplayString,
         pnniSpvcSrcRetryCount             Integer32,
         pnniSpvcSrcLastChangeTime         TimeTicks,
         pnniSpvcSrcStatus                 INTEGER,
         pnniSpvcSrcName                     OCTET STRING,
         pnniSpvcSrcEntryStatus            EntryStatus,
         pnniSpvcSrcRouteCost                Integer32,
         pnniSpvcSrcDtlIndex         Integer32,
         pnniSpvcSrcActiveDtlIndex   Integer32,
         pnniSpvcSrcRerouteStatus    INTEGER,
         pnniSpvcSrcCallingDomain    Integer32,
         pnniSpvcSrcQosIndex         Integer32,
         pnniSpvcSrcDtlIndex1              Integer32,
         pnniSpvcSrcDtlIndex2              Integer32,
         pnniSpvcSrcDtlIndex3              Integer32,
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
            pnniSpvcSrcDtlIndex4            Integer32,
            pnniSpvcSrcDtlWeight1           Integer32,
            pnniSpvcSrcDtlWeight2           Integer32,
            pnniSpvcSrcDtlWeight3           Integer32,
            pnniSpvcSrcDtlWeight4           Integer32,
            pnniSpvcSrcBackoffStatus        INTEGER,
            pnniSpvcSrcPriority             Integer32,
            pnniSpvcSrcLastLocation         DisplayString,
            pnniSpvcSrcOldRouteCost         Integer32,
            pnniSpvcSrcDownReason           INTEGER,
            pnniSpvcSrcActiveDtlNodeIndex   Integer32,
            pnniSpvcSrcDtlTag               Integer32,
            pnniSpvcSrcAutoDtlStatus        INTEGER,
            pnniSpvcSrcRGroupIndex          INTEGER,
            pnniSpvcSrcSecondaryVPI         Integer32,
            pnniSpvcSrcSecondaryVCI         Integer32,
            pnniSpvcSrcSPVCRedirectionIndex Integer32,
            pnniSpvcSrcSPVCRedirectionDest  INTEGER,
            pnniSpvcSrcSPVCResiliencyIndex  Integer32,
            pnniSpvcSrcSPVCResiliencyState  INTEGER,
    } pnniSpvcSrcSPVCResiliencyIndex    OBJECT-TYPE
      SYNTAX       Integer32
      MAX-ACCESS   read-create
      STATUS       current
      DESCRIPTION
            "The index of the Call Resiliency information used
            for providing Source SPVCC resiliency."
      ::= { pnniSpvcSrcEntry 55 } pnniSpvcSrcResiliencyState  OBJECT-TYPE
      SYNTAX   INTEGER { active (1),
                         inhibited (2) }
      MAX-ACCESS   read
      STATUS   current
      DESCRIPTION
            "The value of this object identifies the
            state of the source resilient SPVC."
      ::= { pnniSpvcSrcEntry 56 }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
--
-- PNNI SPVxC Resiliency Configuration Parameters
-- pnniSpvxSrcResiliencyParamsTable   OBJECT IDENTIFIER   ::= { q2931Group 27 } pnniSpvcSrcResiliencyParamsSpvccDeadSilenceInterval   OBJECT-TYPE
        SYNTAX   Unsigned32
                MAX-ACCESS         read-write
                STATUS current
                DESCRIPTION
                        "The time interval between two successive cell counting done
                        on SPVCs before the SPVC source is declared dead, expressed
                        in sec."
                DEFVAL     { 5 }
                ::= { pnniSpvcSrcResiliencyParamsTable 1 } pnniSpvcSrcResiliencyParamsSpvccPollingTimerInterval        OBJECT-TYPE
        SYNTAX       Unsigned32
                MAX-ACCESS         read-write
                STATUS   current
                DESCRIPTION
                        "The time interval between two polls to check the status of
                        partner SPVC on the partner switch, expressed in millisecs."
                DEFVAL     { 1000 }
                ::= { pnniSpvcSrcResiliencyParamsTable 2 }
```

UNITED STATES PATENT AND TRADEMARK OFFICE
CERTIFICATE OF CORRECTION

PATENT NO. : 7,313,087 B2
APPLICATION NO. : 10/600184
DATED : December 25, 2007
INVENTOR(S) : Lingaraj S. Patil et al.

It is certified that error appears in the above-identified patent and that said Letters Patent is hereby corrected as shown below:

```
pnniSpvcSrcResiliencyParamsSpvccPollingNumSpvcs    OBJECT-TYPE
        SYNTAX      Integer32
            MAX-ACCESS       read-write
            STATUS   current
            DESCRIPTION
                "The no. of SPVCs polled per polling interval expressed in
                SPVCs/Poll."
            DEFVAL      { 5 }
            ::= { pnniSpvcSrcResiliencyParamsTable 3 }
```

Signed and Sealed this

Twentieth Day of January, 2009

JON W. DUDAS
*Director of the United States Patent and Trademark Office*